(12) United States Patent
Cho et al.

(10) Patent No.: US 12,522,734 B2
(45) Date of Patent: Jan. 13, 2026

(54) SURFACE TREATMENT COMPOSITION FOR TERNARY HOT-DIP GALVANNEALED STEEL SHEET, SURFACE-TREATED TERNARY HOT-DIP GALVANNEALED STEEL SHEET USING SAME, AND PREPARATION METHOD THEREOF

(71) Applicant: POSCO Co., Ltd, Pohang-si (KR)

(72) Inventors: Soo-Hyoun Cho, Gwangyang-si (KR); Won-Ho Son, Pohang-si (KR)

(73) Assignee: POSCO CO., LTD, Pohang-si (KR)

( * ) Notice: Subject to any disclaimer, the term of this patent is extended or adjusted under 35 U.S.C. 154(b) by 517 days.

(21) Appl. No.: 18/024,132

(22) PCT Filed: Sep. 2, 2021

(86) PCT No.: PCT/KR2021/011845
§ 371 (c)(1),
(2) Date: Mar. 1, 2023

(87) PCT Pub. No.: WO2022/050718
PCT Pub. Date: Mar. 10, 2022

(65) Prior Publication Data
US 2023/0348732 A1    Nov. 2, 2023

(30) Foreign Application Priority Data
Sep. 2, 2020  (KR) ......................... 10-2020-0111426

(51) Int. Cl.
C23C 2/40    (2006.01)
C08K 5/23    (2006.01)
C09D 5/08    (2006.01)
C09D 7/20    (2018.01)
C09D 7/41    (2018.01)
C09D 7/65    (2018.01)
C09D 175/00  (2006.01)
C23C 2/06    (2006.01)
C23C 2/12    (2006.01)
C23C 2/26    (2006.01)

(52) U.S. Cl.
CPC .............. *C09D 5/08* (2013.01); *C08K 5/23* (2013.01); *C09D 7/20* (2018.01); *C09D 7/41* (2018.01); *C09D 7/65* (2018.01); *C09D 175/00* (2013.01); *C23C 2/06* (2013.01); *C23C 2/12* (2013.01); *C23C 2/26* (2013.01); *C23C 2/40* (2013.01)

(58) Field of Classification Search
None
See application file for complete search history.

(56) References Cited

U.S. PATENT DOCUMENTS

| | | | |
|---|---|---|---|
| 2010/0291379 A1* | 11/2010 | Jo ........................... | C23C 28/00 252/519.31 |
| 2012/0196967 A1 | 8/2012 | Iwao et al. | |
| 2016/0068704 A1 | 3/2016 | Ma et al. | |
| 2017/0369735 A1* | 12/2017 | Kwak ..................... | C23C 22/74 |
| 2018/0044809 A1 | 2/2018 | Kawamura et al. | |
| 2019/0270894 A1 | 9/2019 | Jo et al. | |

FOREIGN PATENT DOCUMENTS

| | | |
|---|---|---|
| CN | 103254755 A | 8/2013 |
| CN | 105670505   | 6/2016 |
| EP | 1959030 A2  | 8/2008 |
| JP | S51-071233 A | 6/1976 |
| JP | S53-028857 A | 3/1978 |
| JP | H07-96699 B2 | 10/1995 |
| JP | 2002-332574 A | 11/2002 |
| JP | 2005-15834 A | 1/2005 |
| JP | 2005-146340 A | 6/2005 |
| JP | 2007-51323 A | 3/2007 |
| JP | 2011-508689 A | 3/2011 |
| JP | 2012-001785 A | 1/2012 |
| JP | 2012-117108 A | 6/2012 |
| JP | 2018-104689 A | 7/2018 |
| JP | 2018-527466 A | 9/2018 |
| JP | 2019-112644 A | 7/2019 |
| KR | 10-0784084 B1 | 12/2007 |
| KR | 10-2010-0045338 A | 5/2010 |

(Continued)

OTHER PUBLICATIONS

Chinese Office Action dated Aug. 10, 2023 issued in Chinese Patent Application No. 202180054358.0.
Y. Zhou, "Photovoltaic," Hubei Science & Technology Press, 1st edition, Sep. 30, 2016, pp. 196-197 (with English Abstract).
T. Qiang, "Synthetic Leather Chemicals," China Light Industry Press, 1st edition, Jul. 31, 2016, pp. 32 and 33 (with English Abstract).
International Search Report dated Dec. 16, 2021 issued in International Patent Application No. PCT/KR2021/011845 (with English translation).

(Continued)

*Primary Examiner* — Eli D. Strah
(74) *Attorney, Agent, or Firm* — Morgan Lewis & Bockius LLP

(57) ABSTRACT

The present disclosure is to provide a surface treatment composition that may impart excellent corrosion resistance, blackening resistance, and alkali resistance, and an intrinsic surface color property to a ternary hot-dip galvannealed steel sheet. The present disclosure provides a surface treatment composition containing: based on 100 wt % of a solid content of the composition, 70 to 90 wt % of a resin mixture including a high molecular weight polysilicon-modified polyurethane main resin, a low molecular weight polysilicon-modified polyurethane auxiliary resin, and an acrylic urethane auxiliary resin; 5 to 25 wt % of a melamine-based curing agent; 0.5 to 10 wt % of an inorganic additive; 0.5 to 10 wt % of a silane coupling agent; 0.1 to 2 wt % of an adhesion promoter; 0.1 to 2 wt % of a coloring pigment; and 0.1 to 1 wt % of a pigment stabilizer.

20 Claims, No Drawings

(56) References Cited

FOREIGN PATENT DOCUMENTS

| KR | 10-2010-0067533 A | 6/2010 |
|----|-------------------|--------|
| KR | 10-2012-0101612 A | 9/2012 |
| KR | 10-2014-0081574 A | 7/2014 |
| KR | 10-2014-0143053 A | 12/2014 |
| KR | 10-2016-0071219 A | 6/2016 |
| KR | 10-2017-0118844 A | 10/2017 |
| KR | 10-2018-0054959 A | 5/2018 |
| WO | 2017/047853 A1 | 3/2017 |

OTHER PUBLICATIONS

Office Action issued Jan. 30, 2024 for Japanese Patent Application No. 2023-514468.

\* cited by examiner

SURFACE TREATMENT COMPOSITION FOR TERNARY HOT-DIP GALVANNEALED STEEL SHEET, SURFACE-TREATED TERNARY HOT-DIP GALVANNEALED STEEL SHEET USING SAME, AND PREPARATION METHOD THEREOF

CROSS-REFERENCE OF RELATED APPLICATIONS

This application is the U.S. National Phase under 35 U.S.C. § 371 of International Patent Application No. PCT/KR2021/011845, filed on Sep. 2, 2021, which in turn claims the benefit of Korean Application No. 10-2020-0111426, filed on Sep. 2, 2020, the entire disclosures of which applications are incorporated by reference herein.

TECHNICAL FIELD

The present disclosure relates to a surface treatment composition for a ternary hot-dip galvannealed steel sheet, a ternary hot-dip galvannealed steel sheet surface-treated using the same, and a method for manufacturing the same.

BACKGROUND ART

In general, as a steel material having excellent corrosion resistance to red rust, in comparison to a pure galvanized steel sheet, most exposed surfaces of steel sheets include a hot-dip galvannealed layer containing magnesium (Mg) and aluminum (Al) contain zinc (Zn) or a zinc alloy (Zn alloy), and in a case in which the steel sheet is exposed to a general living environment, or in particular, to a humid atmosphere, a white rust phenomenon occurs on the surface. In addition, since magnesium and aluminum contained in the plated layer have a higher oxygen affinity than zinc, a blackening phenomenon is likely to occur when the amount of oxygen combined with zinc is insufficient.

In the related art, as a part of an anti-rust treatment, a metal surface was pre-treated with chromate in an amount of 5 to 100 mg/m$^2$ to form an organic coating film. However, due to heavy metals such as chromium (Cr) contained in the pre-treatment agent, additional pre-treatment facilities and processes were required, and the safety of workers was problematic due to heavy metal wastewater. In addition, it was necessary for a hexavalent chromium-containing solution generated in washing water and wastewater to be treated according to a specific treatment process, which has caused an increase in manufacturing costs, and also in the case of the chromate-treated plated steel sheet, chromium ions were eluted when being in use or discarded, which has caused a serious environmental pollution problem.

In order to secure corrosion resistance while solving such problems, a surface treatment agent such as a corrosion-resistant metal coating agent that does not contain chromium has been developed in the related art. As an example, Patent Documents 1 and 2 disclose techniques for forming a coating material containing aluminum biphosphate or by combining tannic acid with an aromatic carboxylic acid such as sodium acetate, sodium borate, or imidazole, and a surfactant, but these techniques have a problem with deterioration in corrosion resistance. Patent Document 3 discloses a surface treatment agent containing zirconium carbonate, vanadyl ions, a zirconium compound, and the like, and the surface treatment agent has excellent corrosion resistance, but is vulnerable to blackening resistance.

Meanwhile, Patent Document 4 discloses a surface treatment agent containing titanium-based, zirconium-based, phosphoric acid-based, and molybdenum-based compounds, and the like, but a blackening phenomenon is not suppressed in a hot-dip galvannealed steel sheet containing magnesium (Ma), aluminum (Al), and the like. Patent Document 5 discloses a surface treatment agent containing ammonium molybdate, a water-dispersed urethane resin, isopropylamine, ammonium zirconium carbonate, an epoxy-based silane coupling agent, and silica sol, but the surface treatment agent cannot provide sufficient corrosion resistance.

Meanwhile, in order for a steel material to be used for a building material, surface characteristics need to be aesthetic, and it is required to impart an intrinsic color so that the surface of the material is able to be distinguished from the existing hot-dip galvanized steel material and hot-dip galvannealed steel material when used by customers.

RELATED ART DOCUMENT

Patent Documents (Patent Document 1) Japanese Patent Laid-Open Publication No. S53-28857
(Patent Document 2) Japanese Patent Laid-Open Publication No. S51-71233
(Patent Document 3) Japanese Patent Laid-Open Publication No. 2002-332574
(Patent Document 4) Japanese Patent Laid-Open Publication No. H7-096699
(Patent Document 5) Japanese Patent Laid-Open Publication No. 2005-146340

DISCLOSURE

Technical Problem

The present disclosure has been devised in consideration of the circumstances as described above, and an object of the present disclosure is to provide a surface treatment composition that may impart excellent corrosion resistance, blackening resistance, and alkali resistance, and an intrinsic surface color property to a ternary hot-dip galvannealed steel sheet used as a building material.

Another object of the present disclosure is to provide a surface treatment composition that may impart excellent surface gloss to a hot-dip galvannealed steel sheet without precipitation and aggregation, even when used after long-term storage, due to excellent dispersion stability of a pigment.

Another object of the present disclosure is to provide a surface treatment composition that is harmless to a human body and does not cause a problem due to environmental pollution because it does not contain any heavy metal component such as chromium, which is an environmental pollutant.

Another object of the present disclosure is to provide a hot-dip galvannealed steel sheet having excellent corrosion resistance, blackening resistance, and alkali resistance, and an intrinsic surface color property and a method for manufacturing the same.

Technical Solution

According to an aspect of the present disclosure, a surface treatment composition contains: based on 100 wt % of a solid content of the composition, 70 to 90 wt % of a resin mixture including a high molecular weight polysilicon-modified polyurethane main resin, a low molecular weight polysilicon-modified polyurethane auxiliary resin, and an acrylic urethane auxiliary resin; 5 to 25 wt % of a melamine-based curing agent; 0.5 to 10 wt % of an inorganic additive; 0.5 to 10 wt % of a silane coupling agent; 0.1 to 2 wt % of an adhesion promoter; 0.1 to 2 wt % of a coloring pigment; and 0.1 to 1 wt % of a pigment stabilizer.

According to another aspect of the present disclosure, a surface-treated ternary hot-dip galvannealed steel sheet includes: a steel sheet; a ternary hot-dip galvannealed layer formed on at least one surface of the steel sheet; and a surface-treated coating layer formed on the ternary hot-dip galvannealed layer, wherein the surface-treated coating layer is formed using the surface treatment composition.

According to another aspect of the present disclosure, a method for manufacturing a surface-treated ternary hot-dip galvannealed steel sheet includes: coating the surface treatment composition on a ternary hot-dip galvannealed steel sheet in which a ternary hot-dip galvannealed layer is formed; and drying the coated surface treatment composition to form a surface-treated coating layer.

Advantageous Effects

A surface-treated coating layer is formed by coating the surface treatment composition according to the present disclosure on a hot-dip galvannealed steel sheet, such that it is possible to provide a hot-dip galvannealed steel sheet having excellent corrosion resistance, blackening resistance, and alkali resistance, and an intrinsic surface color property.

Further, the surface treatment composition according to the present disclosure may not cause precipitation and aggregation, even when used after long-term storage due to excellent dispersion stability of a pigment, and may impart excellent surface gloss to the hot-dip galvannealed steel sheet.

Further, the surface treatment composition according to the present disclosure is harmless to the human body and does not cause a problem due to environmental pollution because it does not contain any heavy metal component such as chromium, which is an environmental pollutant.

BEST MODE FOR INVENTION

Hereinafter, preferred exemplary embodiments in the present disclosure will be described with reference to various exemplary embodiments. However, exemplary embodiments in the present disclosure may be modified in several other forms, and the scope of the present disclosure is not limited to exemplary embodiments to be described below.

The present disclosure relates to a surface treatment composition for a ternary hot-dip galvannealed steel sheet that has excellent solution stability and may impart excellent flat sheet corrosion resistance, processed part corrosion resistance, blackening resistance, and alkali resistance, and excellent surface properties when applied to a ternary hot-dip galvannealed steel sheet. In addition, the present disclosure relates to a ternary hot-dip galvannealed steel sheet surface-treated using the surface treatment composition, and a method for manufacturing the same.

According to an exemplary embodiment in the present disclosure, a surface treatment composition may contain: based on 100 wt % of a solid content of the composition, 70 to 90 wt % of a resin mixture including a high molecular weight polysilicon-modified polyurethane main resin, a low molecular weight polysilicon-modified polyurethane auxiliary resin, and an acrylic urethane auxiliary resin; 5 to 25 wt % of a melamine-based curing agent; 0.5 to 10 wt % of an inorganic additive; 0.5 to 10 wt % of a silane coupling agent; 0.1 to 2 wt % of an adhesion promoter; 0.1 to 2 wt % of a coloring pigment; and 0.1 to 1 wt % of a pigment stabilizer.

In an exemplary embodiment, the high molecular weight polysilicon-modified polyurethane main resin is a component that may impart excellent corrosion resistance, water resistance, and solvent resistance to a ternary hot-dip galvannealed steel sheet. The high molecular weight polysilicon-modified polyurethane main resin is not limited thereto, but may be synthesized from a silicon polymer and a polycarbonate polyol, and has a self-crosslinking property because a trimer isocyanate polymer is used during synthesis.

A weight average molecular weight (Mw) of the high molecular weight polysilicon-modified polyurethane main resin may be 100,000 to 200,000. When the weight average molecular weight is less than 100,000, it is difficult to secure sufficient corrosion resistance. On the other hand, when the weight average molecular weight exceeds 200,000, solution stability is deteriorated, and hardness of the coating film is increased, which may cause deterioration in workability.

A glass transition temperature (Tg) of the high molecular weight polysilicon-modified polyurethane main resin may be $-20°$ C. to $-10°$ C. When the glass transition temperature is lower than $-20°$ C., it is difficult to secure sufficient corrosion resistance. On the other hand, when the glass transition temperature exceeds $-10°$ C., solution stability is deteriorated, and hardness of the coating film is increased, which may cause deterioration in workability.

In an exemplary embodiment, the low molecular weight polysilicon-modified polyurethane auxiliary resin is a component that may enhance workability and adhesion by imparting softness to the ternary hot-dip galvannealed steel sheet. The low molecular weight polysilicon-modified polyurethane auxiliary resin is not limited thereto, but may be synthesized from a silicon polymer and a polycarbonate polyol. Unlike the high molecular weight polysilicon-modified polyurethane main resin, the low molecular weight polysilicon-modified polyurethane auxiliary resin does not have a self-crosslinking property.

A weight average molecular weight of the low molecular weight polysilicon-modified polyurethane auxiliary resin may be 30,000 to 70,000. When the weight average molecular weight is less than 30,000, it is difficult to secure sufficient corrosion resistance due to a reduction in density of the coating film. On the other hand, when the weight average molecular weight exceeds 70,000, workability and adhesion may be deteriorated due to an insufficient effect of imparting softness to the coating film.

A glass transition temperature (Tg) of the low molecular weight polysilicon-modified polyurethane auxiliary resin may be $-30°$ C. to $-20°$ C. When the glass transition temperature is lower than $-30°$ C., it is difficult to secure sufficient corrosion resistance due to a reduction in density of the coating film. On the other hand, when the glass transition temperature exceeds $-20°$ C., workability and adhesion may be deteriorated due to an insufficient effect of imparting softness to the coating film.

In an exemplary embodiment, the acrylic urethane auxiliary resin is a component for forming a dense coating film on the ternary hot-dip galvannealed steel sheet and improving heat resistance adhesion. The acrylic urethane auxiliary resin may be a copolymer of an acrylic resin and a polycarbonate-based urethane resin. The acrylic resin may have one or more structural units selected from the group consisting of methyl methacrylate (MMA) and butyl acrylate (BA).

A weight average molecular weight of the polycarbonate-based urethane resin may be 80,000 to 120,000. When the weight average molecular weight is less than 80,000, the effect of improving denseness and heat resistance adhesion of the coating film may not be sufficient. On the other hand, when the weight average molecular weight exceeds 120,000, workability may be deteriorated due to excessive hardness of the coating film.

A glass transition temperature (Tg) of the polycarbonate-based urethane resin may be 50° C. to 70° C. When the glass transition temperature is lower than 50° C., the effect of improving heat resistance adhesion may not be sufficient. On the other hand, when the glass transition temperature exceeds 70° C., workability may be deteriorated due to excessive hardness of the coating film.

In the resin mixture, the high molecular weight polysilicon-modified polyurethane main resin, the low molecular weight polysilicon-modified polyurethane auxiliary resin, and the acrylic urethane auxiliary resin may be mixed at a weight ratio of 1:4.5:4.5 to 9:0.5:0.5, preferably 1:0.5:0.5 to 9:0.5:0.5, and more preferably 2:0.5:0.5 to 9:0.5:0.5. For example, the high molecular weight polysilicon-modified polyurethane main resin, the low molecular weight polysilicon-modified polyurethane auxiliary resin, and the acrylic urethane auxiliary resin may be mixed at a weight ratio of 2:0.5:0.5, and more preferably, may be mixed at a weight ratio of 1:0.5:0.5.

When a content of the high molecular weight polysilicon-modified polyurethane main resin in the resin mixture is too low, flat sheet corrosion resistance, processed part corrosion resistance, and alkali resistance of the steel sheet may be deteriorated. On the other hand, when the content of the high molecular weight polysilicon-modified polyurethane main resin in the resin mixture is too high, processed part corrosion resistance and blackening resistance of the steel sheet may be deteriorated.

In an exemplary embodiment, a content of the resin mixture may be 70 to 90 wt % based on 100 wt % of a solid content of the surface treatment composition. When the content of the resin mixture is less than 70 wt %, it is difficult to secure sufficient corrosion resistance and alkali resistance, and when the content of the resin mixture exceeds 90 wt %, a content of the curing agent and the inorganic compound in the surface treatment composition is relatively low, such that corrosion resistance may be rather deteriorated, and solution stability may be deteriorated.

In an exemplary embodiment, the melamine-based curing agent may serve to form a solid coating film by forming dense crosslinking through a reaction with the main resin and the auxiliary resin of the surface treatment composition for a ternary hot-dip galvannealed steel sheet. In addition, the melamine-based curing agent may include one or more functional groups selected from the group consisting of a methoxymethyl group, a methylol group, and an imino group, and the functional group may be crosslinked with a backbone polymer resin containing a carboxyl group. In this case, the backbone polymer resin refers to the main resin and the auxiliary resin according to an exemplary embodiment in the present disclosure.

A content of the melamine-based curing agent may be 5 to 25 wt % based on 100 wt % of the solid content of the surface treatment composition. When the content of the melamine-based curing agent is less than 5 wt %, sufficient crossliking may not be formed, and thus physical properties may not be improved, and when the content of the melamine-based curing agent exceeds 25 wt %, solution stability is deteriorated due to excessive crosslinking, and thus solidification may occur over time.

In an exemplary embodiment, the inorganic additive is a component for imparting water resistance and blackening resistance to a ternary hot-dip galvannealed steel sheet surface-treated using the surface treatment composition for a ternary hot-dip galvannealed steel sheet. As the inorganic additive, one or more selected from the group consisting of silica sol, alumina sol, titania sol, and zirconia sol may be used.

A content of the inorganic additive may be 0.5 to 10 wt % based on 100 wt % of the solid content of the surface treatment composition. When the content of the inorganic additive is less than 0.5 wt %, it is difficult to secure water resistance and blackening resistance, and when the content of the inorganic additive exceeds 10 wt %, the effect of improving blackening resistance may be insufficient, and corrosion resistance may be deteriorated.

In an exemplary embodiment, the silane coupling agent is a component for performing a coupling reaction by modifying a water-soluble organic resin of the surface treatment composition to form a strong bond between the water-soluble organic resin and the inorganic additive. A content of the silane coupling agent may be 0.5 to 10 wt % based on 100 wt % of the solid content of the surface treatment composition. When the content of the silane coupling agent is less than 0.5 wt %, it is difficult to secure corrosion resistance due to an insufficient amount of the silane coupling agent required at the time of coupling of the organic resin and the inorganic additive, and when the content of the silane coupling agent exceeds 10 wt %, after reaction with the organic resin, an unreacted silane coupling agent may be present, which may cause deterioration in corrosion resistance after processing.

As the silane coupling agent, one or more selected from the group consisting of vinylmethoxysilane, vinyltrimethoxysilane, vinylepoxysilane, vinyltriepoxysilane, methyltrimethoxysilane, tetraethyl orthosilicate, tetramethyl orthosilicate, 3-aminopropyltriepoxysilane, 3-glycidoxypropyltrimethoxysilane, 3-glycidoxypropyltriethoxysilane, 3-mercaptopropyltrimethoxysilane, N-(1,3-dimethylbutylidene)-3-(triepoxysilane)-1-propanamine, N,N-bis[3-(trimethoxysilyl)propyl]ethylenediamine, N-(β-aminoethyl)-γ-aminopropylmethyldimethoxysilane, N-(β-aminoethyl)-γ-aminopropyltrimethoxysilane, γ-glycidoxypropyltriethoxysilane, γ-mercaptopropyltriethoxysilane, and N-[2-(vinylbenzylamino)ethyl]-3-aminopropyltrimethoxysilane may be used.

The silane coupling agent may be hydrolyzed by one or more acids selected from the group consisting of formic acid, acetic acid, phosphoric acid, hydrochloric acid, and nitric acid.

In an exemplary embodiment, the adhesion promoter is a component for improving adhesion between the steel sheet and the resin to prevent peeling of the coating film and to prevent moisture from permeating the plated layer under a high humidity environment. As the adhesion promoter, one or more selected from the group consisting of ester phosphate and ammonium phosphate may be used.

A content of the adhesion promoter may be 0.1 to 2 wt % based on 100 wt % of the solid content of the surface treatment composition. When the content of the adhesion promoter is less than 0.1 wt %, the effect of improving adhesion and preventing water permeation may be insufficient, and when the content of the adhesion promoter exceeds 2 wt %, solution stability of the surface treatment composition may be deteriorated.

In an exemplary embodiment, the coloring pigment is a component for imparting aesthetic surface properties by imparting a color to the ternary hot-dip galvannealed steel sheet. As the coloring pigment, one or more selected from the group consisting of one or more inorganic pigments selected from the group consisting of titanium, lead, iron, copper, and chromium; and an azo-based organic pigment may be used.

A content of the coloring pigment may be 0.1 to 2 wt % based on 100 wt % of the solid content of the surface treatment composition. When the content of the coloring pigment is less than 0.1 wt %, a sufficient color may not be exhibited, and when the content of the coloring pigment exceeds 2 wt %, solution stability and corrosion resistance may be deteriorated.

In an exemplary embodiment, the pigment stabilizer is a component for capping the coloring pigment to uniformly disperse the coloring pigment in the coating film, thereby improving gloss of the coating film. The pigment stabilizer may be a carboxylic polymer, but is not limited thereto.

A content of the pigment stabilizer may be 0.1 to 1 wt % based on 100 wt % of the solid content of the surface treatment composition. When the content of the pigment stabilizer is less than 0.1 wt %, sufficient solution stability may not be secured, and when the content of the pigment stabilizer exceeds 1 wt %, gloss of the coating film may be rather deteriorated due to excessive residual components.

In an exemplary embodiment, the surface treatment composition may contain water as a solvent for diluting the respective components, and the water may be deionized water or distilled water. The solvent is contained as a balance in addition to the respective components of the present disclosure, and a content thereof may be 60 to 80 wt %. Furthermore, the surface treatment composition according to an exemplary embodiment may further contain alcohol as an auxiliary solvent for securing solution stability, and the alcohol may be ethanol or isopropyl alcohol. The alcohol may be contained in an amount of 3 to 10 wt % with respect to the entire solvent.

The tertiary hot-dip galvannealed steel sheet surface-treated with the surface treatment composition containing a water-soluble organic resin and an inorganic compound according to an exemplary embodiment in the present disclosure has excellent corrosion resistance and blackening resistance as well as an excellent surface color and gloss. In addition, the surface treatment composition according to an exemplary embodiment in the present disclosure does not contain hexavalent chromium, which is a harmful environmental substance, and contains a water-soluble organic resin and an inorganic compound harmless to a human body as a main component, such that damage to the human body and problems of environmental pollution may be prevented.

According to an exemplary embodiment in the present disclosure, a tertiary hot-dip galvannealed steel sheet surface-treated with the surface treatment composition described above is provided.

Specifically, the surface-treated tertiary hot-dip galvannealed steel sheet may include: a steel sheet; a ternary hot-dip galvannealed layer formed on at least one surface of the steel sheet; and a surface-treated coating layer that is formed on the ternary hot-dip galvannealed layer and contains an organic resin and an inorganic compound.

The base steel sheet and the ternary hot-dip galvannealed layer may include an Al-rich layer formed at an interface therebetween, and an area ratio occupied by the Al-rich layer may be 70% to 100%. In addition, the ternary hot-dip galvannealed layer may contain 0.2 to 15 wt % of Al, 0.5 to 3.5 wt % of Mg, and a balance of Zn and inevitable impurities.

In an exemplary embodiment, the tertiary hot-dip galvannealed steel sheet may include an Al-rich layer formed at an interface between a base iron and a Zn—Al—Mg-based alloy plating layer, and an area ratio occupied by the Al-rich layer may be 70% to 100% and more preferably 73% to 100%. Here, the occupied area ratio refers to a ratio of an area of the Al-rich layer to an area of the base iron on the assumption of a flat surface without considering three-dimensional curvature when viewed from the surface of the plated steel sheet in a thickness direction of the base iron. When the area ratio occupied by the Al-rich layer is 70% or more, the Al-rich layer has a form in which fine particles are continuously formed, such that plating properties and plating adhesion may be significantly improved.

In the ternary hot-dip galvannealed steel sheet according to an exemplary embodiment in the present disclosure, Mg plays a significantly important role in improving corrosion resistance of the ternary hot-dip galvannealed steel sheet, and effectively prevents corrosion of the ternary hot-dip galvannealed steel sheet by forming a dense zinc hydroxide-based corrosion product on the surface of the plated layer under a corrosive environment. In order to secure the corrosion resistance effect desired in the present disclosure, Mg needs to be contained in the plated layer in an amount of 0.5 wt % or more and more preferably 0.9 wt % or more. However, when the content thereof is excessive, Mg oxide dross rapidly increases on a surface of a plating bath, and an anti-oxidation effect is canceled by the addition of trace elements. In terms of preventing this, Mg needs to be contained in the plated layer in an amount of 3.5 wt % or less and more preferably 3.2 wt % or less.

In the ternary hot-dip galvannealed steel sheet according to an exemplary embodiment in the present disclosure, Al suppresses the formation of Mg oxide dross in the plating bath, and forms a Zn—Al—Mg-based intermetallic compound by reacting with Zn and Mg in the plating bath, such that corrosion resistance of the plated steel sheet is improved. In order to obtain the above effect, Al needs to be contained in the plated layer in an amount of 0.2 wt % or more and more preferably 0.9 wt % or more. However, when the content thereof is excessive, weldability and phosphate treatment properties of the plated steel material may be deteriorated. In terms of preventing this, Al needs to be contained in the plated layer in an amount of 15 wt % or less and more preferably 12 wt % or less.

The surface-treated coating layer containing the organic resin and the inorganic compound may be formed by using a surface treatment composition containing, based on 100 wt % of a solid content of the composition, 70 to 90 wt % of a resin mixture including a high molecular weight polysilicon-modified polyurethane main resin, a low molecular weight polysilicon-modified polyurethane auxiliary resin, and an acrylic urethane auxiliary resin; 5 to 25 wt % of a melamine-based curing agent; 0.5 to 10 wt % of an inorganic additive; 0.5 to 10 wt % of a silane coupling agent; 0.1 to 2 wt % of an adhesion promoter; 0.1 to 2 wt % of a coloring pigment; and 0.1 to 1 wt % of a pigment stabilizer. Since the surface treatment composition has the same technical characteristics as described above, it will be not be repeatedly described.

In an exemplary embodiment, the surface-treated coating layer is a coating layer formed by drying the surface treatment composition, and corresponds to components remaining after all the volatile substances contained in the surface-treated coating layer containing the organic resin and the inorganic compound are volatilized. Therefore, in the surface-treated coating layer containing the organic resin and the inorganic compound, a solvent such as water or alcohol is not contained, and the solvent contained in the surface treatment composition containing the organic resin and the inorganic compound is also not contained. Therefore, a content of the components contained in the surface-treated coating layer containing the organic resin and the inorganic compound is based on 100 wt % of the total solids content.

According to an exemplary embodiment in the present disclosure, there is provided a method for manufacturing a surface-treated ternary hot-dip galvannealed steel sheet, the method including: coating the surface treatment composition on a ternary hot-dip galvannealed steel sheet in which a ternary hot-dip galvannealed layer is formed; and drying the coated surface treatment composition to form a surface-treated coating layer.

In an exemplary embodiment, the surface treatment composition may be coated to a thickness of 2.5 to 50 μm. In addition, the coated surface treatment composition undergoes a drying process to form a dried coating layer, and a thickness of the dried coating layer may be 1 to 10 μm. When the coating thickness of the surface treatment composition is less than 2.5 μm, the surface treatment composition is applied too thinly on a peak portion of the roughness of the steel sheet, and thus, corrosion resistance may be deteriorated, and when the coating thickness exceeds 50 μm, the coating layer is too thick, and thus, workability may be deteriorated and there may be problems in cost-effectiveness due to an increase in cost of solution treatment.

A method of coating the surface treatment composition is not particularly limited as long as it is a coating method commonly performed. For example, it is preferably to perform any coating method selected from roll coating, spraying, immersion, spray squeezing, and immersion squeezing.

A process of drying the surface treatment composition coated on the ternary hot-dip galvannealed steel sheet is preferably performed at a temperature of 70 to 250° C. based on a peak metal temperature (PMT) of the material steel sheet. When the drying temperature is lower than 70° C. based on the peak metal temperature (PMT) of the material steel sheet, the curing reaction of the organic resin is not performed completely, such that a solid coating film structure may not be formed and corrosion resistance and alkali resistance may be deteriorated. On the other hand, when the drying temperature exceeds 250° C. based on the peak metal temperature (PMT) of the material steel sheet, work productivity may be deteriorated due to generation of water vapor and fume during a water-cooling process, and surface quality of a product may be deteriorated due to a condensation phenomenon in which evaporated water vapor condenses on an upper portion of drying equipment.

Meanwhile, the drying process is preferably performed in a hot-air drying furnace or an induction heating furnace. In a case where the surface treatment composition is dried using the hot-air drying furnace, an internal temperature of the hot-air drying furnace is preferably 100 to 300° C. Meanwhile, in a case where the surface treatment composition is dried using the induction heating furnace, a current applied to the induction heating furnace is preferably 1,000 to 5,000 A and more preferably 1,500 to 3,500 A. When the internal temperature of the hot-air drying furnace is lower than 100° C. or the current applied to the induction heating furnace is lower than 1,000 A, the curing reaction of the surface treatment composition is not completely performed, and thus, corrosion resistance and alkali resistance may be deteriorated. In addition, the internal temperature of the hot-air drying furnace exceeds 300° C. or the current applied to the induction heating furnace exceeds 5,000 A, work productivity may be deteriorated due to generation of water vapor and fume during the water-cooling process, and surface quality of a product may be deteriorated due to a condensation phenomenon in which evaporated water vapor condenses on an upper portion of drying equipment.

In addition, the surface treatment composition is dried to form a surface-treated coating layer, and then the surface-treated coating layer is cooled with water, such that a surface-treated tertiary hot-dip galvannealed steel sheet may be provided finally.

The method for manufacturing a tertiary hot-dip galvannealed steel sheet according to an exemplary embodiment in the present disclosure may be performed by a continuous process, and a speed of the continuous process is preferably 80 to 120 mpm. When the speed of the continuous process is lower than 80 mpm, productivity may be reduced, and when the speed of the continuous process exceeds 120 mpm, the solution may be scattered in the process of drying the surface treatment composition, which may cause defects on the surface.

MODE FOR INVENTION

Examples

Preparation of Test Specimen

A ternary hot-dip galvannealed steel sheet (coating weight on one surface: 0.5 to 2.0 g/m$^2$) including a ternary hot-dip galvannealed layer containing, by wt %, 1.5% of Mg, 1.5% of Al, and a balance of Zn was cut into a size of 7 cm×15 cm (width×length), oil was removed from the ternary hot-dip galvannealed steel sheet, each of prepared compositions was applied to the ternary hot-dip galvannealed steel sheet using a bar coater. Subsequently, curing was performed under a condition of a peak metal temperature (PMT) of 180±20° C., thereby preparing a test specimen.

Test and Evaluation Method

The method and criteria for evaluating the physical properties of the surface-treated steel sheet in the present Examples are as follows.

<Flat Sheet Corrosion Resistance>

The specimen was treated in accordance with the method specified in ASTM B117, and then, a rate of occurrence of white rust in the steel sheet over time was measured. In this case, the evaluation criteria are as follows.

⊚: The time taken for white rust to be generated was 144 hours or longer.
○: The time taken for white rust to be generated was 96 hours or longer and shorter than 144 hours.
Δ: The time taken for white rust to be generated was 55 hours or longer and shorter than 96 hours.
X: The time taken for white rust to be generated was shorter than 55 hours.

<Processed Part Corrosion Resistance>

The specimen was pushed up to a height of 6 mm using an Erichsen tester, and a degree of generation of white rust was measured when 24 hours have elapsed. In this case, the evaluation criteria are as follows.

⊚: Less than 5% of white rust generation area after 48 hours have elapsed

Δ: 5% or more and less than 7% of white rust generation area after 48 hours have elapsed X: 7% or more of white rust generation area after 48 hours have elapsed <Blackening Resistance>

The specimen was left in a thermo-hygrostat maintained at 50° C. and a relative humidity of 95% for 120 hours, and a color change (color difference: ΔE) of the specimen before and after the test was observed. In this case, the evaluation criteria are as follows.
 ⊚: ΔE≤2
 ○: 2<ΔE≤3
 Δ: 3<ΔE≤4
 X: ΔE>4

<Alkali Resistance>

The specimen was immersed in an alkali degreasing solution at 60° C. for 2 minutes, the immersed specimen was subjected to washing with water, and air blowing, and then a pre-post difference in color (ΔE) was measured. As the alkali degreasing solution, Finecleaner L 4460 A: 20 g/2.4 L+L 4460 B 12 g/2.4 L (pH=12) manufactured by Parkerizing Co., Ltd. was used. In this case, the evaluation criteria are as follows.
 ⊚: ΔE≤2
 ○: 2<ΔE≤3
 Δ: 3<ΔE≤4
 X: ΔE>4

<Solution Stability>

The surface treatment composition placed in a container was put into a constant temperature oven at 50° C., and after storage of 7 days, occurrence of precipitates was visually observed, and a change in viscosity was measured. In this case, the evaluation criteria are as follows.
 ○: No generation of precipitates and change in viscosity of less than 1 cP
 Δ: No generation of precipitates and change in viscosity of 1 cP or more and less than 5 cP
 X: Generation of precipitates or change in viscosity of 5 cP or more Components of Surface Treatment Composition The components of the surface treatment composition used in Examples are as follows:
 High molecular weight polysilicon-modified polyurethane main resin: polyurethane resin having weight average molecular weight of 150,000
 Low molecular weight polysilicon-modified polyurethane auxiliary resin (auxiliary resin 1): polyurethane resin having weight average molecular weight of 50,000
 Acrylic urethane auxiliary resin (auxiliary resin 2): copolymer resin of acrylic resin having methyl methacrylate (MMA) and butyl acrylate (BA) structural units and polycarbonate-based urethane resin having weight average molecular weight of 100,000
 Curing agent: melamine curing agent (CYMEL 303)
 Inorganic additive: titania sol compound
 Silane coupling agent: silane coupling agent in which vinyltriepoxysilane, methyltrimethoxysilane, and 3-glycidoxypropyltrimethoxysilane are mixed at weight ratio of 1:1:1
 Adhesion promoter: phosphoric acid ester compound
 Coloring pigment: azo-based organic pigment
 Pigment stabilizer: carboxylic polymer
 Solvent: mixed solvent of water and ethanol.

Example 1: Change in Physical Properties Depending on Content of Resin Mixture

A resin mixture obtained by mixing the main resin, the auxiliary resin 1, and the auxiliary resin 2 at a weight ratio of 1:0.5:0.5, a curing agent, an inorganic additive, a silane coupling agent, an adhesion promoter, a coloring pigment, and a pigment stabilizer were mixed in the contents shown in Table 1, thereby preparing a surface treatment composition. In the surface treatment composition, a mixed solvent of water and ethanol was used as a solvent.

The solution stability of the prepared surface treatment composition was evaluated. In addition, the surface treatment composition was applied to the test specimen described above, and then flat sheet corrosion resistance, processed part corrosion resistance, blackening resistance, and alkali resistance of the specimen were evaluated. The evaluation results are shown in Table 1.

TABLE 1

| Classification | Composition of composition (wt %) | | | | | | | Flat sheet corrosion resistance | Processed part corrosion resistance | Blackening resistance | Alkali resistance | Solution stability |
| | Resin mixture | Curing agent | Inorganic additive | Silane coupling agent | Adhesion promoter | Coloring pigment | Pigment stabilizer | | | | | |
| --- | --- | --- | --- | --- | --- | --- | --- | --- | --- | --- | --- | --- |
| Comparative Example 1 | 65 | 25 | 4 | 4 | 0.5 | 1 | 0.5 | X | X | ○ | X | ○ |
| Inventive Example 1 | 70 | 20 | 4 | 4 | 0.5 | 1 | 0.5 | ○ | ⊚ | ○ | ○ | ○ |
| Inventive Example 2 | 80 | 14 | 2 | 2 | 0.5 | 1 | 0.5 | ⊚ | ⊚ | ⊚ | ⊚ | ○ |
| Inventive Example 3 | 90 | 6 | 1 | 1 | 0.5 | 1 | 0.5 | ⊚ | ⊚ | ⊚ | ⊚ | ○ |
| Comparative Example 2 | 94 | 3 | 1 | 0.5 | 0.5 | 0.5 | 0.5 | X | X | X | ○ | X |

* The content of the composition is based on 30 wt % of the solid content

Referring to Table 1, in Inventive Examples 1 to 3 in which the content of the resin mixture satisfied the content suggested by the present disclosure, all the physical properties showed good (○) or higher results. However, in Comparative Example 1 in which the amount of the resin mixture contained was too small, the flat sheet corrosion resistance, the processed part corrosion resistance, and the alkali resistance showed poor results, and in Comparative Example 2 in which the amount of the resin mixture contained was too large, the flat sheet corrosion resistance, the processed part corrosion resistance, the blackening resistance, and the solution stability exhibited poor results.

Example 2: Change in Physical Properties Depending on Content Ratio of Main Resin and Auxiliary Resin A surface treatment composition containing 80 wt % of a resin mixture including the main resin, the auxiliary resin 1, and the auxiliary resin 2, 10 wt % of a curing agent, 4 wt % of an inorganic additive, 4 wt % of a silane coupling agent, 0.5 wt % of an adhesion promoter, 1 wt % of a coloring pigment, and 0.5 wt % of a pigment stabilizer was prepared. In the surface treatment composition, a mixed solvent of water and ethanol was used as a solvent.

In the resin mixture, the main resin, the auxiliary resin 1, and the auxiliary resin 2 were mixed at the weight ratio shown in Table 2.

The surface treatment composition was applied to the test specimen, and the flat sheet corrosion resistance, the processed part corrosion resistance, the blackening resistance, and the alkali resistance of the specimen were evaluated. The evaluation results are shown in Table 2.

was too small, the flat sheet corrosion resistance, the processed part corrosion resistance, and the alkali resistance showed poor results, and in Comparative Example 4 in which the amount of the auxiliary resin 1 and auxiliary resin 2 contained was too small, the processed part corrosion resistance and the blackening resistance showed poor results.

Example 3: Change in Physical Properties Depending on Content of Curing Agent A resin mixture obtained by mixing the main resin, the auxiliary resin 1, and the auxiliary resin 2 at a weight ratio of 1:0.5:0.5, a curing agent, an inorganic additive, a silane coupling agent, an adhesion promoter, a coloring pigment, and a pigment stabilizer were mixed in the contents shown in Table 3, thereby preparing a surface treatment composition. In the surface treatment composition, a mixed solvent of water and ethanol was used as a solvent.

The solution stability of the prepared surface treatment composition was evaluated. In addition, the surface treat-

TABLE 2

| Classification | Weight ratio (A:B:C) | | | Flat sheet corrosion resistance | Processed part corrosion resistance | Blackening resistance | Alkali resistance |
| --- | --- | --- | --- | --- | --- | --- | --- |
| | Main resin (A) | Auxiliary resin 1 (B) | Auxiliary resin 2 (C) | | | | |
| Comparative Example 3 | 5 | 47.5 | 47.5 | X | X | ○ | X |
| Inventive Example 4 | 10 | 45 | 45 | ○ | ⊚ | ○ | ○ |
| Inventive Example 5 | 50 | 25 | 25 | ⊚ | ⊚ | ⊚ | ⊚ |
| Inventive Example 6 | 67 | 16.5 | 16.5 | ⊚ | ⊚ | ⊚ | ⊚ |
| Inventive Example 7 | 90 | 5 | 5 | ⊚ | ⊚ | ⊚ | ⊚ |
| Comparative Example 4 | 95 | 2.5 | 2.5 | ○ | X | X | ○ |

* The content of the composition is based on 30 wt % of the solid content

Referring to Table 2, in Inventive Examples 4 to 7 in which the weight ratio of the main resin to the auxiliary resin satisfied the content ratio suggested by the present disclosure, all the physical properties showed good (○) or higher results. On the other hand, in Comparative Example 3 in which the amount of the water-soluble main resin contained ment composition was applied to the test specimen described above, and then flat sheet corrosion resistance, processed part corrosion resistance, blackening resistance, and alkali resistance of the specimen were evaluated. The evaluation results are shown in Table 3.

TABLE 3

| Classification | Composition of composition(wt %) | | | | | | | Flat sheet corrosion resistance | Processed part corrosion resistance | Blackening resistance | Alkali resistance | Solution stability |
| --- | --- | --- | --- | --- | --- | --- | --- | --- | --- | --- | --- | --- |
| | Curing agent | Resin | Inorganic additive | Silane coupling agent | Adhesion promoter | Coloring pigment | Pigment stabilizer | | | | | |
| Comparative Example 5 | 4 | 84 | 5 | 5 | 0.5 | 1 | 0.5 | X | X | X | X | ○ |
| Inventive Example 8 | 5 | 84 | 5 | 4 | 0.5 | 1 | 0.5 | ○ | ○ | ○ | ○ | ○ |
| Inventive Example 9 | 15 | 74 | 5 | 4 | 0.5 | 1 | 0.5 | ⊚ | ⊚ | ⊚ | ⊚ | ○ |
| Inventive Example 10 | 25 | 70 | 2 | 1 | 0.5 | 1 | 0.5 | ⊚ | ⊚ | ○ | ⊚ | ○ |
| Comparative Example 6 | 26 | 70 | 1 | 1 | 0.5 | 1 | 0.5 | ○ | ○ | ○ | X | X |

* The content of the composition is based on 30 wt % of the solid content

Referring to Table 3, in Inventive Examples 8 to 10 in which the content of the melamine curing agent satisfied the content suggested by the present disclosure, all the physical properties showed good (○) or higher results. On the other hand, in Comparative Example 5 in which the amount of the melamine curing agent contained was too small, all the physical properties except for the solution stability showed poor results, and in Comparative Example 6 in which the amount of the melamine curing agent contained was too small, the alkali resistance and the solution stability showed poor results.

Referring to Table 4, in Inventive Examples 11 to 13 in which the content of the inorganic additive satisfied the content suggested by the present disclosure, all the physical properties showed good (○) or higher results. However, in Comparative Example 7 in which the amount of the inorganic additive contained was too small, the flat sheet corrosion resistance, the processed part corrosion resistance, and the blackening resistance showed poor results, and in Comparative Example 8 in which the amount of the inorganic additive contained was too large, the flat sheet corrosion resistance and the processed part corrosion resistance showed poor results.

Example 4: Change in Physical Properties Depending on Content of Organic Additive A resin mixture obtained by mixing the main resin, the auxiliary resin 1, and the auxiliary resin 2 at a weight ratio of 1:0.5:0.5, a curing agent, an inorganic additive, a silane coupling agent, an adhesion promoter, a coloring pigment, and a pigment stabilizer were mixed in the contents shown in Table 4, thereby preparing a surface treatment composition. In the surface treatment composition, a mixed solvent of water and ethanol was used as a solvent.

The solution stability of the prepared surface treatment composition was evaluated. In addition, the surface treatment composition was applied to the test specimen described above, and then flat sheet corrosion resistance, processed part corrosion resistance, blackening resistance, and alkali resistance of the specimen were evaluated. The evaluation results are shown in Table 4.

Example 5: Change in Physical Properties Depending on Content and Type of Silane Coupling Agent A resin mixture obtained by mixing the main resin, the auxiliary resin 1, and the auxiliary resin 2 at a weight ratio of 1:0.5:0.5, a curing agent, an inorganic additive, a silane coupling agent, an adhesion promoter, a coloring pigment, and a pigment stabilizer were mixed in the contents shown in Table 5, thereby preparing a surface treatment composition. In the surface treatment composition, a mixed solvent of water and ethanol was used as a solvent.

The solution stability of the prepared surface treatment composition was evaluated. In addition, the surface treatment composition was applied to the test specimen described above, and then flat sheet corrosion resistance, processed part corrosion resistance, blackening resistance, and alkali resistance of the specimen were evaluated. The evaluation results are shown in Table 5.

TABLE 4

| Classification | Composition of composition (wt %) | | | | | | | Flat sheet corrosion resistance | Processed part corrosion resistance | Blackening resistance | Alkali resistance | Solution stability |
| --- | --- | --- | --- | --- | --- | --- | --- | --- | --- | --- | --- | --- |
| | Inorganic additive | Resin | Curing agent | Silane coupling agent | Adhesion promoter | Coloring pigment | Pigment stabilizer | | | | | |
| Comparative Example 7 | 0.4 | 84 | 10 | 4 | 0.5 | 0.6 | 0.5 | X | X | X | ○ | ○ |
| Inventive Example 11 | 0.5 | 84 | 10 | 4 | 0.5 | 0.5 | 0.5 | ○ | ○ | ○ | ○ | ○ |
| Inventive Example 12 | 5 | 75 | 14 | 4 | 0.5 | 1 | 0.5 | ◎ | ◎ | ◎ | ◎ | ○ |
| Inventive Example 13 | 10 | 70 | 14 | 2 | 0.5 | 1 | 0.5 | ◎ | ◎ | ○ | ◎ | ○ |
| Comparative Example 8 | 11 | 70 | 14 | 3 | 0.5 | 1 | 0.5 | X | X | ○ | ○ | ○ |

* The content of the composition is based on 30 wt % of the solid content

TABLE 5

| Classification | Composition of composition (wt %) | | | | | | | Processed | | | | |
|---|---|---|---|---|---|---|---|---|---|---|---|---|
| | Silane coupling agent | Resin | Curing agent | Inorganic additive | Adhesion promoter | Coloring pigment | Pigment stabilizer | Flat sheet corrosion resistance | part corrosion resistance | Blackening resistance | Alkali resistance | Solution stability |
| Comparative Example 9 | 0.4 | 84 | 10 | 4 | 0.5 | 0.6 | 0.5 | X | X | X | ○ | ○ |
| Inventive Example 14 | 0.5 | 84 | 10 | 4 | 0.5 | 0.5 | 0.5 | ○ | ◎ | ○ | ○ | ○ |
| Inventive Example 15 | 5 | 75 | 14 | 4 | 0.5 | 1 | 0.5 | ◎ | ◎ | ◎ | ◎ | ○ |
| Inventive Example 16 | 10 | 70 | 14 | 2 | 0.5 | 1 | 0.5 | ◎ | ◎ | ◎ | ◎ | ○ |
| Comparative Example 10 | 11 | 70 | 14 | 3 | 0.5 | 1 | 0.5 | ○ | X | X | ○ | ○ |

* The content of the composition is based on 30 wt % of the solid content

Referring to Table 5, in Inventive Examples 14 to 16 in which the content of the silane coupling agent satisfied the content suggested by the present disclosure, all the physical properties showed good (○) or higher results. On the other hand, in Comparative Example 9 in which the amount of the silane coupling agent contained is too small, the flat sheet corrosion resistance, the processed part corrosion resistance, and the blackening resistance showed poor results, and in Comparative Example 10 in which the amount of the silane coupling agent contained is too large, a hard coating film was formed due to an increase in dryness of the coating film, and thus the processed part corrosion resistance and the blackening resistance showed poor results.

Meanwhile, a surface treatment composition was prepared by changing the silane coupling agent to the silane coupling agent shown in Table 6 in the surface treatment composition having the composition according to Inventive Example 15, a specimen was prepared in the same manner as described above, and the flat sheet corrosion resistance was evaluated. The results thereof are shown in Table 6.

TABLE 6

| Classification | A Content | B Content | C Content | D Content | E Content | F Content | G Content | H Content | I Content | J Content | K Content | Flat sheet corrosion resistance |
|---|---|---|---|---|---|---|---|---|---|---|---|---|
| Inventive Example 17 | 5 | 0 | 0 | 0 | 0 | 0 | 0 | 0 | 0 | 0 | 0 | ○ |
| Inventive Example 18 | 0 | 5 | 0 | 0 | 0 | 0 | 0 | 0 | 0 | 0 | 0 | ◎ |
| Inventive Example 19 | 0 | 0 | 5 | 0 | 0 | 0 | 0 | 0 | 0 | 0 | 0 | ○ |
| Inventive Example 20 | 0 | 0 | 0 | 5 | 0 | 0 | 0 | 0 | 0 | 0 | 0 | ◎ |
| Inventive Example 21 | 0 | 0 | 0 | 0 | 5 | 0 | 0 | 0 | 0 | 0 | 0 | ○ |
| Inventive Example 22 | 0 | 0 | 0 | 0 | 0 | 5 | 0 | 0 | 0 | 0 | 0 | ◎ |
| Inventive Example 23 | 0 | 0 | 0 | 0 | 0 | 0 | 5 | 0 | 0 | 0 | 0 | ○ |
| Inventive Example 24 | 0 | 0 | 0 | 0 | 0 | 0 | 0 | 5 | 0 | 0 | 0 | ○ |
| Inventive Example 25 | 0 | 0 | 0 | 0 | 0 | 0 | 0 | 0 | 5 | 0 | 0 | ○ |
| Inventive Example 26 | 0 | 0 | 0 | 0 | 0 | 0 | 0 | 0 | 0 | 5 | 0 | ◎ |
| Inventive Example 27 | 0 | 0 | 0 | 0 | 0 | 0 | 0 | 0 | 0 | 0 | 5 | ○ |
| Inventive Example 28 | 2.5 | 2.5 | 0 | 0 | 0 | 0 | 0 | 0 | 0 | 0 | 0 | ○ |
| Inventive Example 29 | 2.5 | 0 | 0 | 2.5 | 0 | 0 | 0 | 0 | 0 | 0 | 0 | ○ |
| Inventive Example 30 | 0 | 2.5 | 0 | 0 | 0 | 2.5 | 0 | 0 | 0 | 0 | 0 | ◎ |
| Inventive Example 31 | 0 | 0 | 0 | 2.5 | 0 | 2.5 | 0 | 0 | 0 | 0 | 0 | ○ |
| Inventive Example 32 | 0 | 0 | 0 | 0 | 2.5 | 0 | 2.5 | 0 | 0 | 0 | 0 | ○ |
| Inventive Example 33 | 0 | 0 | 0 | 0 | 0 | 2.5 | 0 | 0 | 0 | 2.5 | 0 | ◎ |
| Inventive Example 34 | 0 | 0 | 2.5 | 0 | 0 | 2.5 | 0 | 0 | 0 | 0 | 0 | ○ |
| Inventive Example 35 | 0 | 0 | 0 | 0 | 0 | 0 | 2.5 | 0 | 0 | 2.5 | 0 | ○ |
| Inventive Example 36 | 2.5 | 0 | 0 | 0 | 0 | 0 | 0 | 0 | 0 | 2.5 | 0 | ○ |

TABLE 6-continued

| Classification | A Content | B Content | C Content | D Content | E Content | F Content | G Content | H Content | I Content | J Content | K Content | Flat sheet corrosion resistance |
|---|---|---|---|---|---|---|---|---|---|---|---|---|
| Inventive Example 37 | 0 | 0 | 0 | 0 | 0 | 0 | 0 | 0 | 0 | 2.5 | 2.5 | ○ |
| Inventive Example 38 | 0 | 0 | 0 | 2.5 | 0 | 0 | 0 | 0 | 2.5 | 0 | 0 | ○ |
| Inventive Example 39 | 0 | 0 | 0 | 0 | 2.5 | 0 | 0 | 2.5 | 0 | 0 | 0 | ○ |
| Inventive Example 40 | 0 | 0 | 0 | 0 | 0 | 0 | 0 | 2.5 | 0 | 0 | 2.5 | ○ |
| Inventive Example 41 | 0 | 2.5 | 2.5 | 0 | 0 | 0 | 0 | 0 | 0 | 0 | 0 | ◎ |
| Inventive Example 42 | 0 | 2 | 2 | 0 | 0 | 0 | 0 | 0 | 0 | 0 | 1 | ○ |
| Inventive Example 43 | 0 | 0 | 0 | 1 | 0 | 0 | 2 | 0 | 2 | 0 | 0 | ○ |
| Inventive Example 44 | 0 | 0 | 0 | 0 | 2 | 1 | 0 | 0 | 2 | 0 | 0 | ○ |
| Inventive Example 45 | 0 | 2 | 0 | 3.5 | 0 | 0 | 1 | 0 | 0 | 0 | 2 | ○ |
| Inventive Example 46 | 0 | 2 | 0 | 0 | 0 | 0 | 0 | 0 | 0 | 1 | 2 | ◎ |
| Inventive Example 47 | 2 | 0 | 2 | 0 | 0 | 0 | 0 | 0 | 0 | 0 | 1 | ○ |
| Inventive Example 48 | 0 | 1 | 0 | 0 | 0 | 0 | 0 | 0 | 2 | 2 | 0 | ○ |
| Inventive Example 49 | 0 | 2 | 0 | 0 | 1 | 0 | 0 | 0 | 2 | 0 | 0 | ○ |
| Inventive Example 50 | 0 | 0 | 0 | 0 | 0 | 0 | 2 | 2 | 0 | 0 | 1 | ○ |

A: 2-(3,4-Epoxycyclohexyl)-ethyltrimethoxysilane
B: 3-Glycidoxypropyltrimethoxysilane
C: 3-Glycidoxypropylmethyldiethoxysilane
D: 3-Glycidoxypropyltriethoxysilane
E: N-2-(Aminoethyl)-3-aminopropylmethyldimethoxysilane
F: N-2-(Aminoethyl)-3-aminopropyltrimethoxysilane
G: N-2-(Aminoethyl)-3-aminopropyltriethoxysilane
H: 3-Aminopropyltrimethoxysilane
I: 3-Aminopropyltriethoxysilane
J: Vinyltriepoxysilane
K: Methyltrimethoxysilane

* The content of the composition is based on 30 wt % of the solid content

Referring to Table 6, in Inventive Examples 17 to 50, the flat sheet corrosion resistance showed good (o or excellent (◎) results. In particular, in Inventive Example 46 in which 3-glycidoxypropyltrimethoxysilane, vinyltriepoxysilane, and methyltrimethoxysilane were used at a weight ratio of 2:1:2, the area of white rust generated after 144 hours or longer was 0%, which showed the best results.

Example 6: Change in Physical Properties Depending on Content of Adhesion Promoter A resin mixture obtained by mixing the main resin, the auxiliary resin 1, and the auxiliary resin 2 at a weight ratio of 1:0.5:0.5, a curing agent, an inorganic additive, a silane coupling agent, an adhesion promoter, a coloring pigment, and a pigment stabilizer were mixed in the contents shown in Table 7, thereby preparing a surface treatment composition. In the surface treatment composition, a mixed solvent of water and ethanol was used as a solvent.

The solution stability of the prepared surface treatment composition was evaluated. In addition, the surface treatment composition was applied to the test specimen described above, and then flat sheet corrosion resistance, processed part corrosion resistance, blackening resistance, and alkali resistance of the specimen were evaluated. The evaluation results are shown in Table 7.

TABLE 7

| Classification | Composition of composition (wt %) | | | | | | | Flat sheet corrosion resistance | Processed part corrosion resistance | Blackening resistance | Alkali resistance | Solution stability |
| | Adhesion promoter | Resin | Curing agent | Silane coupling agent | Inorganic additive | Coloring pigment | Pigment stabilizer | | | | | |
|---|---|---|---|---|---|---|---|---|---|---|---|---|
| Comparative Example 11 | 0.05 | 82 | 10 | 3 | 3.45 | 1 | 0.5 | X | X | X | ○ | ○ |
| Inventive Example 51 | 0.1 | 82 | 10 | 3 | 3.4 | 1 | 0.5 | ○ | ○ | ○ | ○ | ○ |

TABLE 7-continued

| | Composition of composition (wt %) | | | | | | Processed | | | | |
|---|---|---|---|---|---|---|---|---|---|---|---|
| Classification | Adhesion promoter | Resin | Curing agent | Silane coupling agent | Inorganic additive | Coloring pigment | Pigment stabilizer | Flat sheet corrosion resistance | part corrosion resistance | Blackening resistance | Alkali resistance | Solution stability |
| Inventive Example 52 | 1 | 75 | 14 | 4 | 4.5 | 1 | 0.5 | ⊚ | ⊚ | ⊚ | ⊚ | ○ |
| Inventive Example 53 | 2 | 75 | 14 | 4 | 3.5 | 1 | 0.5 | ⊚ | ⊚ | ○ | ⊚ | ○ |
| Comparative Example 12 | 2.5 | 75 | 14 | 3 | 4 | 1 | 0.5 | ○ | ○ | ○ | ○ | X |

\* The content of the composition is based on 30 wt % of the solid content

Referring to Table 7, in Inventive Examples 51 to 53 in which the content of the adhesion promoter satisfied the content suggested by the present disclosure, all the physical properties showed good (○) or higher results. However, in Comparative Example 11 in which the amount of the adhesion promoter contained was too small, the flat sheet corrosion resistance, the processed part corrosion resistance, and the alkali resistance showed poor results, and in Comparative Example 12 in which the amount of the adhesion promoter contained was too large, the solution stability showed a poor result.

Example 7: Change in Physical Properties Depending on Content of Coloring Pigment A resin mixture obtained by mixing the main resin, the auxiliary resin 1, and the auxiliary resin 2 at a weight ratio of 1:0.5:0.5, a curing agent, an inorganic additive, a silane coupling agent, an adhesion promoter, a coloring pigment, and a pigment stabilizer were mixed in the contents shown in Table 8, thereby preparing a surface treatment composition. In the surface treatment composition, a mixed solvent of water and ethanol was used as a solvent.

The solution stability of the prepared surface treatment composition was evaluated. In addition, the surface treatment composition was applied to the test specimen described above, and then flat sheet corrosion resistance, processed part corrosion resistance, blackening resistance, and alkali resistance of the specimen were evaluated. The test specimen treated with the surface treatment composition was observed with the naked eye, and the degree of surface color expression was classified into excellent (⊚), good (○), and poor (X). The evaluation results are shown in Table 8.

Referring to Table 8, in Inventive Examples 54 to 56 in which the content of the coloring pigment satisfied the content suggested by the present disclosure, all the physical properties showed good (○) or higher results. However, in Comparative Example 13 in which the amount of the coloring pigment contained was too small, the surface color expression showed a poor result, and in Comparative Example 14 in which the amount of the coloring pigment contained was too large, the flat sheet corrosion resistance, the processed part corrosion resistance, and the solution stability showed poor results.

Example 8: Change in Physical Properties Depending on Content of Pigment Stabilizer A resin mixture obtained by mixing the main resin, the auxiliary resin 1, and the auxiliary resin 2 at a weight ratio of 1:0.5:0.5, a curing agent, an inorganic additive, a silane coupling agent, an adhesion promoter, a coloring pigment, and a pigment stabilizer were mixed in the contents shown in Table 9, thereby preparing a surface treatment composition. In the surface treatment composition, a mixed solvent of water and ethanol was used as a solvent.

The solution stability of the prepared surface treatment composition was evaluated. In addition, the surface treatment composition was applied to the test specimen described above, and then flat sheet corrosion resistance, processed part corrosion resistance, blackening resistance, alkali resistance, and gloss of the specimen were evaluated. The gloss of the test specimen treated with the surface treatment composition was measured at an incident angle of 60° using a gloss meter. It was classified as good (○) when the measurement result was 80 or more and as poor (X) when the measurement was less than 80. The evaluation results are shown in Table 9.

TABLE 8

| | Composition of composition (wt %) | | | | | | | Processed | | Black- | | Surface | |
|---|---|---|---|---|---|---|---|---|---|---|---|---|---|
| Classification | Coloring pigment | Resin | Curing agent | Inorganic additive | Adhesion promoter | coupling agent | Pigment stabilizer | Flat sheet corrosion resistance | part corrosion resistance | ening resistance | Alkali resistance | color expression | Solution stability |
| Comparative Example 13 | 0.05 | 84 | 10 | 4 | 0.5 | 0.95 | 0.5 | ○ | ⊚ | ○ | ○ | X | ○ |
| Inventive Example 54 | 0.1 | 84 | 10 | 4 | 0.5 | 0.9 | 0.5 | ○ | ⊚ | ○ | ○ | ○ | ○ |
| Inventive Example 55 | 1 | 75 | 14 | 4 | 0.5 | 5 | 0.5 | ⊚ | ⊚ | ⊚ | ⊚ | ⊚ | ○ |
| Inventive Example 56 | 2 | 75 | 14 | 4 | 0.5 | 4 | 0.5 | ⊚ | ⊚ | ⊚ | ⊚ | ⊚ | ○ |
| Comparative Example 14 | 2.5 | 75 | 14 | 3 | 0.5 | 4.5 | 0.5 | X | X | ⊚ | ○ | ⊚ | X |

\* The content of the composition is based on 30 wt % of the solid content

TABLE 9

| Classification | Composition of composition (wt %) | | | | | | Processed | | | | | |
| --- | --- | --- | --- | --- | --- | --- | --- | --- | --- | --- | --- | --- |
| | Pigment stabilizer | Resin | Curing agent | Silane coupling agent | Inorganic additive | Adhesion promoter | Coloring pigment | Flat sheet corrosion resistance | Processed part corrosion resistance | Blackening resistance | Gloss | Alkali resistance | Solution stability |
| Comparative Example 15 | 0.05 | 82 | 10 | 3 | 3.45 | 0.5 | 1 | ○ | ○ | ○ | ○ | ○ | X |
| Inventive Example 57 | 0.1 | 82 | 10 | 3 | 3.4 | 0.5 | 1 | ○ | ○ | ○ | ○ | ○ | ○ |
| Inventive Example 58 | 0.5 | 75 | 14 | 4 | 5 | 0.5 | 1 | ◎ | ◎ | ◎ | ○ | ◎ | ○ |
| Inventive Example 59 | 1 | 75 | 14 | 4 | 4.5 | 0.5 | 1 | ◎ | ◎ | ○ | ○ | ◎ | ○ |
| Comparative Example 16 | 1,5 | 75 | 14 | 4 | 4 | 0.5 | 1 | ○ | ○ | ○ | X | ○ | ○ |

\* The content of the composition is based on 30 wt % of the solid content

Referring to Table 9, in Inventive Examples 57 to 59 in which the content of the pigment stabilizer satisfied the content suggested by the present disclosure, all the physical properties showed good (○) or higher results. However, in Comparative Example 15 in which the amount of the pigment stabilizer was too small, the solution stability showed a poor result, and in Comparative Example 16 in which the amount of the pigment stabilizer was too large, the gloss showed a poor result.

Example 9: Change in Physical Properties According to Thickness and Drying Temperature of Coating Film The test specimen was bar-coated with the surface treatment composition according to Inventive Example 2 and then was dried with a hot-air drying furnace. However, in the surface treatment composition, a resin mixture was prepared by mixing the main resin, the auxiliary resin 1, and the auxiliary resin 2 at 50:25:25 according to Inventive Example 6, and a mixture obtained by mixing 3-glycidoxypropyltrimethoxysilane, vinyltriepoxysilane, and methyltrimethoxysilane at a weight ratio of 2:1:2 was used as the silane coupling agent according to Inventive Example 46.

The thickness and the PMT temperature of the coating layer were controlled as shown in Table 10.

TABLE 10

| Classification | Coating layer thickness (μm) | Drying temperature (° C.) | Flat sheet corrosion resistance | Processed part corrosion resistance | Blackening resistance | Alkali resistance |
| --- | --- | --- | --- | --- | --- | --- |
| Comparative Example 17 | 0.5 | 180 | Δ | X | Δ | Δ |
| Inventive Example 60 | 1 | 180 | ◎ | ◎ | ◎ | ◎ |
| inventive Example 61 | 4 | 180 | ◎ | ◎ | ◎ | ◎ |
| Inventive Example 62 | 7 | 180 | ◎ | ◎ | ○ | ◎ |
| Inventive Example 63 | 10 | 180 | ◎ | ◎ | ○ | ◎ |
| Comparative Example 18 | 11 | 180 | ◎ | X | ○ | ◎ |
| Comparative Example 19 | 5 | 50 | X | X | X | X |
| Inventive Example 64 | 5 | 70 | ○ | ○ | ○ | Δ |
| Inventive Example 65 | 5 | 100 | ◎ | ◎ | ◎ | ◎ |
| Inventive Example 66 | 5 | 250 | ◎ | ◎ | ○ | ◎ |
| Comparative Example 20 | 5 | 270 | ◎ | ◎ | X | ◎ |

As shown in Table 10, in Inventive Examples 60 to 63 in which the coating layer having a thickness of 1 to 10 μm was formed, all the physical properties showed good (○) or higher results. On the other hand, in Comparative Example 17 in which the formed coating film was too thin, the flat sheet corrosion resistance, the blackening resistance, and the alkali resistance showed moderate (Δ) results, and the processed part corrosion resistance showed a poor result. Meanwhile, in Comparative Example 18 in which the formed coating film was too thick, the processed part corrosion resistance showed a poor result, and since there were no improved physical properties compared to Inventive Example 63, a coating film thickness having a thickness of more than 10 μm was not required in terms of cost-effectiveness. Meanwhile, as shown in Table 10, in Inventive Examples 64 to 66 in which the coating layer was formed by drying the coating film at 70 to 250° C., all the physical properties showed good (○) or higher results. Meanwhile, in Comparative Example 19 in which the drying temperature was excessively low, the coating film was not sufficiently dried, and thus, all the physical properties showed poor results. Meanwhile, in Comparative Example 20 in which the drying temperature was too high, the blackening resistance showed a poor result due to fume drop on the steel sheet caused by a condensation phenomenon of water vapor generated in the steel sheet during the air cooling process (water cooling). Although exemplary embodiments in the present disclosure have been described in detail above, it will be apparent to those skilled in the art that the scope of the present disclosure is not limited thereto, but modifications and variations could be made without departing from the technical idea of the present disclosure described in the claims.

The invention claimed is:

1. A surface treatment composition comprising:
based on 100 wt % of a solid content of the composition,
70 to 90 wt % of a resin mixture including a high molecular weight polysilicon-modified polyurethane main resin, a low molecular weight polysilicon-modified polyurethane auxiliary resin, and an acrylic urethane auxiliary resin;
5 to 25 wt % of a melamine-based curing agent;
0.5 to 10 wt % of an inorganic additive;
0.5 to 10 wt % of a silane coupling agent;
0.1 to 2 wt % of an adhesion promoter;
0.1 to 2 wt % of a coloring pigment; and
0.1 to 1 wt % of a pigment stabilizer.

2. The surface treatment composition of claim 1, wherein the high molecular weight polysilicon-modified polyurethane main resin, the low molecular weight polysilicon-modified polyurethane auxiliary resin, and the acrylic urethane auxiliary resin are mixed at a weight ratio of 1:4.5:4.5 to 9:0.5:0.5.

3. The surface treatment composition of claim 1, wherein the high molecular weight polysilicon-modified polyurethane main resin has a glass transition temperature (Tg) of −20° C. to −10° C. and a weight average molecular weight (Mw) of 100,000 to 200,000.

4. The surface treatment composition of claim 1, wherein the low molecular weight polysilicon-modified polyurethane auxiliary resin has a glass transition temperature (Tg) of −30° C. to −20° C. and a weight average molecular weight (Mw) of 30,000 to 70,000.

5. The surface treatment composition of claim 1, wherein the acrylic urethane auxiliary resin is obtained by copolymerizing an acrylic resin having one or more structural units selected from the group consisting of methyl methacrylate (MMA) and butyl acrylate (BA) and a polycarbonate-based urethane resin.

6. The surface treatment composition of claim 5, wherein the polycarbonate-based urethane resin has a glass transition temperature (Tg) of 50° C. to 70° C. and a weight average molecular weight (Mw) of 80,000 to 120,000.

7. The surface treatment composition of claim 1, wherein the melamine-based curing agent includes one or more functional groups selected from the group consisting of a methoxymethyl group, a methylol group, and an imino group, and
the functional group crosslinks a resin containing a carboxyl group.

8. The surface treatment composition of claim 1, wherein the inorganic additive includes one or more selected from the group consisting of silica sol, alumina sol, titania sol, and zirconia sol.

9. The surface treatment composition of claim 1, wherein the silane coupling agent includes one or more selected from the group consisting of vinylmethoxysilane, vinyltrimethoxysilane, vinylepoxysilane, vinyltriepoxysilane, methyltrimethoxysilane, tetraethyl orthosilicate, tetramethyl orthosilicate, 3-aminopropyltriepoxysilane, 3-glycidoxypropyltrimethoxysilane, 3-glycidoxypropyltriethoxysilane, 3-mercaptopropyltrimethoxysilane, N-(1,3-dimethylbutylidene)-3-(triepoxysilane)-1-propanamine, N,N-bis[3-(trimethoxysilyl)propyl]ethylenediamine, N-(β-aminoethyl)-γ-aminopropylmethyldimethoxysilane, N-(β-aminoethyl)-γ-aminopropyltrimethoxysilane, γ-glycidoxypropyltriethoxysilane, γ-mercaptopropyltriethoxysilane, and N-[2-(vinylbenzylamino)ethyl]-3-aminopropyltrimethoxysilane.

10. The surface treatment composition of claim 9, wherein the silane coupling agent is hydrolyzed by one or more acids selected from the group consisting of formic acid, acetic acid, phosphoric acid, hydrochloric acid, and nitric acid.

11. The surface treatment composition of claim 1, wherein the adhesion promoter is one or more selected from the group consisting of ester phosphate and ammonium phosphate.

12. The surface treatment composition of claim 1, wherein the coloring pigment includes one or more selected from the group consisting of one or more inorganic pigments selected from the group consisting of titanium, lead, iron, copper, and chromium; and an azo-based organic pigment.

13. The surface treatment composition of claim 1, wherein the pigment stabilizer is a carboxylic polymer.

14. The surface treatment composition of claim 1, further comprising a solvent,
wherein a solid content of the solvent is 20 to 40 wt % based on a total weight of the surface treatment composition, and the solvent is a balance of a solvent.

15. The surface treatment composition of claim 14, wherein the solvent contains 3 to 10 wt % of alcohol based on a total weight of the solvent and a balance of water.

16. A surface-treated ternary hot-dip galvannealed steel sheet comprising:
a steel sheet;
a ternary hot-dip galvannealed layer formed on at least one surface of the steel sheet; and
a surface-treated coating layer formed on the ternary hot-dip galvannealed layer,
wherein the surface-treated coating layer is formed using the surface treatment composition of claim 1.

17. The surface-treated tertiary hot-dip galvannealed steel sheet of claim 16, wherein the ternary hot-dip galvannealed layer includes an Al-rich layer formed at an interface, and
an area ratio occupied by the Al-rich layer is 70% to 100%.

18. The surface-treated tertiary hot-dip galvannealed steel sheet of claim 16, wherein the ternary hot-dip galvannealed layer contains 0.2 to 15 wt % of Al, 0.5 to 3.5 wt % of Mg, and a balance of Zn and inevitable impurities.

19. The surface-treated tertiary hot-dip galvannealed steel sheet of claim 16, wherein a thickness of the surface-treated coating layer is 1 μm to 10 μm.

20. A method for manufacturing a surface-treated ternary hot-dip galvannealed steel sheet, the method comprising:
coating the surface treatment composition of claim 1 on a ternary hot-dip galvannealed steel sheet in which a ternary hot-dip galvannealed layer is formed; and drying the coated surface treatment composition to form a surface-treated coating layer.

\* \* \* \* \*